(12) United States Patent
Tsutsumi

(10) Patent No.: US 8,879,107 B2
(45) Date of Patent: Nov. 4, 2014

(54) INFORMATION PROCESSING APPARATUS AND METHOD FOR CONTROLLING SAME

(71) Applicant: Canon Kabushiki Kaisha, Tokyo (JP)

(72) Inventor: Kensuke Tsutsumi, Kawasaki (JP)

(73) Assignee: Canon Kabushiki Kaishi, Tokyo (JP)

( * ) Notice: Subject to any disclaimer, the term of this patent is extended or adjusted under 35 U.S.C. 154(b) by 0 days.

(21) Appl. No.: 13/956,758

(22) Filed: Aug. 1, 2013

(65) Prior Publication Data

US 2013/0314746 A1    Nov. 28, 2013

Related U.S. Application Data

(62) Division of application No. 12/958,327, filed on Dec. 1, 2010.

(30) Foreign Application Priority Data

Dec. 28, 2009   (JP) .................................. 2009-297148

(51) Int. Cl.
    *G06F 3/12*    (2006.01)
    *G06K 15/00*   (2006.01)

(52) U.S. Cl.
    CPC ............ *G06F 3/1203* (2013.01); *G06F 3/1288* (2013.01); *G06F 3/126* (2013.01); *G06F 3/1287* (2013.01); *G06F 3/1204* (2013.01); *G06F 3/1272* (2013.01)
    USPC ......................... 358/1.15; 358/1.13; 358/1.14

(58) Field of Classification Search
    USPC ...................................................... 358/1.15
    See application file for complete search history.

(56) References Cited

U.S. PATENT DOCUMENTS

| | | | |
|---|---|---|---|
| 6,216,159 B1 | 4/2001 | Chintakrindi | |
| 2002/0122201 A1 * | 9/2002 | Haraguchi et al. | 358/1.15 |
| 2003/0053112 A1 * | 3/2003 | Motosugi et al. | 358/1.14 |
| 2005/0083857 A1 * | 4/2005 | Takahashi et al. | 370/254 |
| 2006/0165459 A1 * | 7/2006 | Ishii | 400/62 |
| 2008/0304101 A1 | 12/2008 | Sasase | |
| 2009/0080022 A1 | 3/2009 | Tsutsumi | |
| 2009/0303547 A1 * | 12/2009 | Kurihara | 358/3.28 |
| 2010/0103453 A1 | 4/2010 | Tsutsumi | |
| 2011/0157631 A1 | 6/2011 | Tsutsumi | |

FOREIGN PATENT DOCUMENTS

| | | |
|---|---|---|
| JP | 6-332642 | 12/1994 |
| JP | 2005-115533 | 4/2005 |
| WO | WO 2009038228 A1 * | 3/2009 |

* cited by examiner

*Primary Examiner* — Huo Long Chen
(74) *Attorney, Agent, or Firm* — Fitzpatrick, Cella, Harper & Scinto

(57) ABSTRACT

The request management server receives a print data acquisition request received from the client device located at an external access-limited site, and specifies the print server disposed in the site to which the user device belongs as a device that prints the print data. Then, the request management server provides an instruction to the specified print server about the acquisition of the print data via the client device which has made the print data acquisition request.

4 Claims, 11 Drawing Sheets

FIG. 3A

ESTIMATION FORM

| ESTIMATION NUMBER | 0000321 |
| DATE | 2009/6/4 |

NAME: MITSUMORI TAROU
ADDRESS: TOKYO XXXX 1-1-1

| PRODUCT NAME | QUANTITY | UNIT COST | AMOUNT OF MONEY |
|---|---|---|---|
| FORM MAKING KIT 1 | 3 | ¥10,000 | ¥30,000 |
| FORM MAKING KIT 2 | 1 | ¥20,000 | ¥20,000 |
| FORM MAKING KIT 3 | 2 | ¥25,000 | ¥50,000 |
| | | | |
| | | | |
| | | | |
| | | | |
| | | | |

TOTAL AMOUNT ¥100,000

[SAVE] 202   [PRINT] 203

FIG. 3B

| CONTENT URI |
| SESSION ID |
| USER NAME |
| ... |

INFORMATION PROCESSING APPARATUS AND METHOD FOR CONTROLLING SAME

This application is a division of application Ser. No. 12/958,327, filed Dec. 1, 2010.

BACKGROUND OF THE INVENTION

1. Field of the Invention

The present invention relates to an information processing apparatus and a method for controlling the information processing apparatus.

2. Description of the Related Art

A system in which a work server operates in conjunction with a print server to thereby perform print processing for the print data has been proposed. For example, there is a printing system in which data such as a form is transmitted from a work server located on a LAN (Local Area Network) to a print server, and the print server starts printing after obtaining authorization on a panel. In recent years, there has been an increase in the popularity of a cloud-based service which can build virtual machines on the network because of a high-speed network line and improvements in grid-computing technology due to the maintenance of network infrastructure. Along with the popularity of the cloud-based service, a system which provides software services utilizing virtual machines on the cloud-based service has also been proposed. Even in a work server which has conventionally been built in a LAN, the configuration has been employed such that data or processing is centrally managed on the cloud-based service.

Japanese Patent Laid-Open No. 6-332642 discloses a distributed printing system that performs print processing by a plurality of print servers on the network in a distributed manner. The distributed printing system searches for a print server with no job based on job information and transfers a print request to the print server. Also, Japanese Patent Laid-Open No. 2005-115533 discloses a content delivery system in which a management server selects a delivery server based on distribution management information and notifies a terminal device about the information when the terminal device makes a content delivery request to the management server. In the content delivery system, the terminal device redirects to the delivery server that has been reported to thereby transmit a content delivery request, and the delivery server delivers the requested content to the terminal device.

When the work server on a cloud-based service is utilized, an access is made from the Web browser on the client device located in the LAN, which is protected by a firewall, to the work server. Here, in general, an access can be made from the Web browser on the client device to the cloud-based service, and the cloud-based service side can return a response to the request made from the client device side. However, an access cannot be made to the interior of a firewall by the request made from the cloud-based service side. Thus, in a cloud environment, data cannot be transmitted to the print server located at the site (local area) by the request made from the work server.

In order to print out print data within the work server on the cloud-based service, a technique in which a work server generates a page having a print button which is linked to a print server and the generated page is passed to the client Web browser to cause it to display on the client device may be conceived. According to the technique, when a user presses the displayed print button, a print data acquisition request (request) is made from the Web browser on the client device to a print server in the LAN. Then, the print server, which has received the request, acquires the data to be printed from the work server.

Here, since the work server on the cloud-based service is open to the public on, for example, an internet, the work server is commonly operated at a plurality of sites. However, a link to a print server, which is attached to a print button generated by the work server, is fixed. Thus, the print data acquisition requests, which have been made from the user devices located at a plurality of sites, cannot be allocated to the print servers at the plurality of sites. In addition, even in the technique in which the print server on which the request has been received transfers the request to a print server located at another site, an access is limited by the firewall located at the site, whereby the request cannot be reached.

SUMMARY OF THE INVENTION

The information processing apparatus of the present invention allocates the print data acquisition requests received from user devices located at a plurality of access-limited local areas to the print devices located at the plurality of local areas.

According to an aspect of the present invention, an information processing apparatus is provided that processes a print data acquisition request received from a user device located at each of a plurality of external access-limited local areas. The information processing apparatus includes a request receiving unit configured to receive the print data acquisition request from the user device; a print device specification unit configured to specify a print device disposed in a local area to which the user device, which has made the print data acquisition request, belongs as a device that prints the print data; and a print data acquisition instruction unit configured to provide an instruction to the specified print device about the acquisition of the print data via the user device which has made the print data acquisition request.

Further features of the present invention will become apparent from the following description of exemplary embodiments with reference to the attached drawings.

BRIEF DESCRIPTION OF THE DRAWINGS

FIG. 3A is a diagram illustrating an example of a work page display screen.

FIG. 3B is a diagram illustrating an example of request information.

DESCRIPTION OF THE EMBODIMENTS

Figure 1:
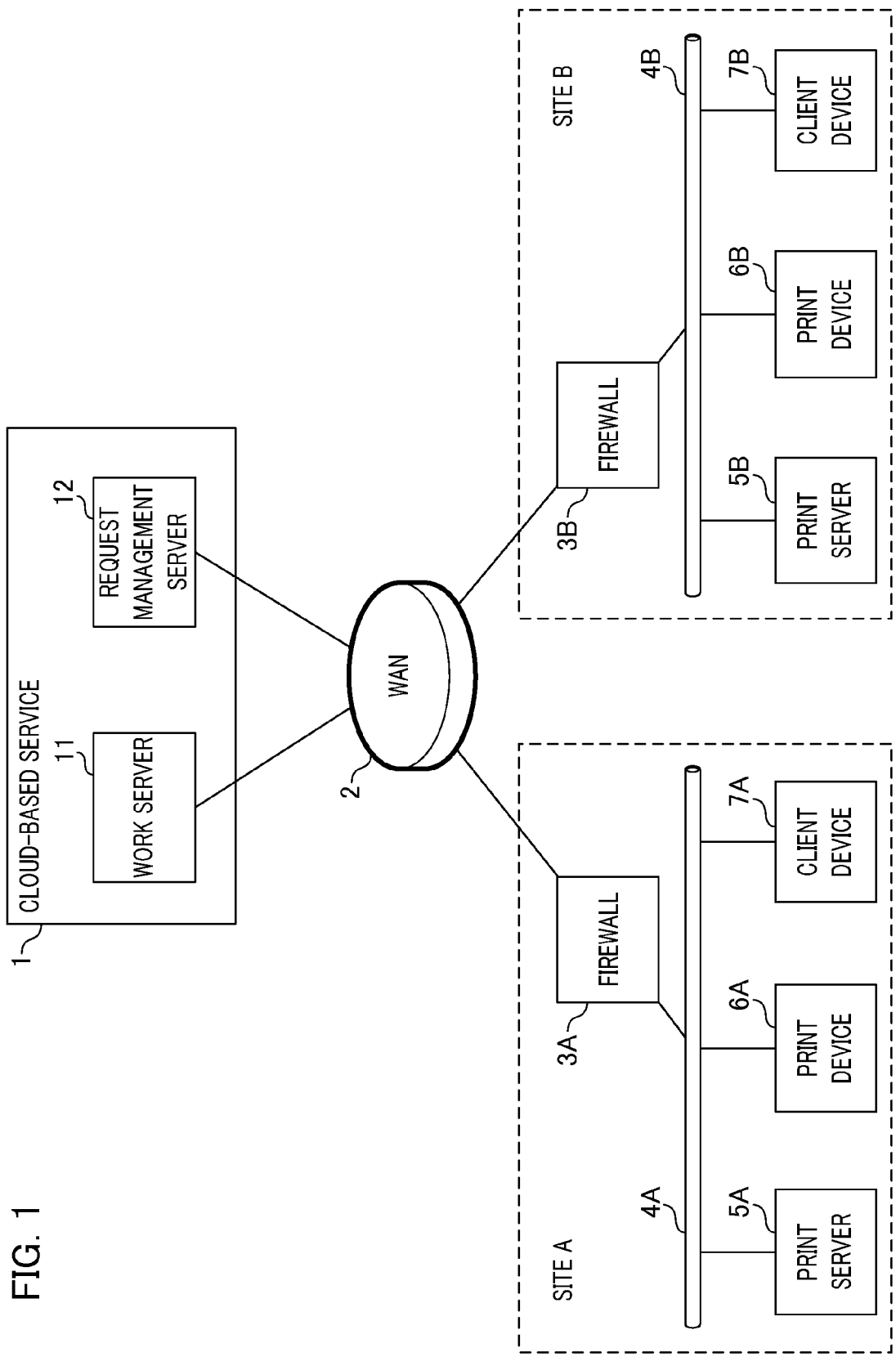
FIG. 1 is a diagram showing an example of the configuration of a printing system according to the present embodiment.

FIG. 1 is a diagram showing an example of the configuration of a printing system according to the present embodiment. The printing system shown in FIG. 1 includes a print server, a print device, and a client device, all of which are located at each of the sites A and B, and a cloud-based service 1 that is connected to each of the sites via a wide area network (Wide Area Network: WAN) 2. Each of the sites A and B is a local area to which access from the outside is limited by a firewall.

The cloud-based service 1 is a system (cloud computing) that virtualizes computer resources such as a plurality of CPUs, memory, HDDs, and the like and opens a platform for operating the software to the public on the WAN 2. The term "CPU" is the abbreviation for Central Processing Unit and the term "HDD" is the abbreviation for Hard Disk Drive. The cloud-based service 1 provides the platform as a service to the client device in the site, which is connected thereto via the WAN 2. Software that has been registered by the client device is deployed in a memory provided within the cloud-based service 1 and is executed by the CPU. Since the computer resources required for the operation of software are virtualized by the cloud-based service 1, there is no need for software to be aware of the computer resources that operate in the background of the cloud-based service 1.

The representative form of the cloud-based service 1 includes a form in which an OS (Operating System) and Web application can be registered. Servers (a work server 11 and a request management server 12) to be operated on the cloud-based service 1 may operate on the registered OS, or the servers may be registered as Web applications. In other words, the service provided by the cloud-based service 1 may take any form. In the present embodiment, a description will be given of an example in which an OS is registered in the cloud-based service 1 to cause the servers to operate on the OS.

The cloud-based service 1 includes a work server 11 and a request management server 12. The work server 11 is a virtual server to be operated on the cloud-based service 1, and is connected to the processing unit in each of the sites via the WAN 2. Since the work server 11 is a virtual server to be operated on the cloud-based service 1, a user who operates the processing unit in each of the sites can utilize the work server 11 without having to be aware of where the computer resources constituting the work server 11 are located.

The work server 11 has a Web server function. More specifically, the work server 11 is accessed from the client device (for example, client device 7A and 7B shown in FIG. 1) in the sites to thereby provide (display) a work page to the client device. The work page is a page that is used for the job execution by the client device. Access from the client device to the work server 11 is performed by the Web browser provided by the client device. After the client device has logged in the work server 11 through the Web browser, the client device can execute jobs using the work page. The data that has been created by the client device on the work page provided from the work server 11 is stored in the work server 11. In the present embodiment, the work page provided by the work server 11 is customized and a print button is provided on the work page. The print button is a button that is used for making a document acquisition request from the client device to the request management server 12. The document acquisition request is a request for the data stored in the work server 11 to be acquired as the data to be printed (print data), i.e., a print data acquisition request. When a user of the client device presses the print button, a document acquisition request is transmitted from the client device to the request management server 12. Also, the work server 11 has a Web interface. A print server to be described below can acquire print data held by the work server 11 via the Web interface. Note that, in order to acquire print data, a session ID and a user name, which are issued when the client device has logged in the work server 11, are necessary.

The request management server 12 is the information processing apparatus of the present embodiment, and processes a document acquisition request transmitted from the client device. As in the work server 11, the request management server 12 is a virtual server to be operated on the cloud-based service 1, and is connected to the processing unit in each of the sites via the WAN 2. Since the request management server 12 is a virtual server to be operated on the cloud-based service 1, a user who operates the processing unit in each of the sites can utilize the request management server 12 without having to be aware of where the computer resources constituting the request management server 12 are located.

The request management server 12 receives a document acquisition request from the client device via the WAN 2, and specifies a print server 5, which processes for printing print data, based on the information of the received document acquisition request. The request management server 12 returns the redirect request for the document acquisition request sent to the specified print server 5 to the client device as a response to the received document acquisition request. The redirect request is a request for causing the client device to redirect the document acquisition request to the specified print server 5. The print server 5, which has received the redirect request, acquires print data from the work server 11 to execute print processing for the print data.

The sites A and B are local areas which are connected to different LANs, i.e., LANs 4A and 4B, respectively. Although only two sites are shown in FIG. 1, the number of sites may be one or two or more. A firewall, a print server, a print device, and a client device are connected to each LAN. The firewalls 3A and 3B have the same configuration. The print servers 5A and 5B have the same configuration. The print devices 6A and 6B have the same configuration. Furthermore, the client device 7A and 7B have the same configuration. Thus, in the following, the firewalls 3A and 3B are collectively referred to as a firewall 3. The print servers 5A and 5B are collectively referred to as a print server 5. The print devices 6A and 6B are collectively referred to as a print device 6. Furthermore, the client devices 7A and 7B are collectively referred to as a client device 7.

The firewall 3 is also connected to the WAN 2. The firewall 3 has a function to limit an access from the WAN 2 to the LAN provided with the firewall 3. The cloud-based service 1 connected to the WAN 2 cannot provide access to the LAN due to the firewall 3. On the other hand, access from the LAN to the WAN 2 can be made. In addition, communication cannot be established between the sites which are mutually connected via the WAN 2.

The print server 5 is a server computer that executes monitoring and management of the print device 6 within the site, monitoring and management of a print job, and generation and transfer of a print job. When the printing system of the present embodiment is a large-scale printing system, the print server 5 may be formed in, for example, a cluster configuration with redundancy so as to distribute the load. The print server 5 also has a Web interface. The client device 7, which has received the redirect request for the document acquisition request from the request management server 12, makes the redirect request for the document acquisition request to the print server 5 via the Web interface. When the print server 5 receives the redirect request from the client device 7, the print server 5 makes a print data acquisition request to the work server 11 via the WAN 2 to thereby acquire print data. The print server 5 serves as a print device that provides an instruction to the print device 6 to cause it to perform print processing for the acquired print data. Also, the client device 7 can acquire the print job managed by the print server 5 and the state of the print device 6, and control the print job via the Web interface provided by the print server 5.

The print device 6 performs print data print processing upon receiving an instruction from the print server 5 via the LAN. A laser beam printer, which uses an electro-photographic format, an inkjet printer, which uses an inkjet format, and the like can be applied as a print device 6. The client device 7 is a user device that is operated by a user. The client device 7 is, for example, a computer device such as a PC (Personal Computer) or the like. The client device 7 may include a permanent storage device such as a HDD or the like, or may have the thin client configuration provided with a temporary storage device. In the present embodiment, the client device 7 includes a Web browser, and the client device 7 provides an access to the work server 11 through the Web browser. More specifically, when the client device 7 receives provision of a work page from the work server 11 through the Web browser, the client device 7 generates print data on the work page. The client device 7 causes the work server 11 to store the generated print data. Also, the client device 7 transmits a document acquisition request, which is a print data acquisition request, to the request management server 12 depending on the operation performed by a user who wishes to print out the print data stored in the work server 11. The printing system, including the information processing apparatus of the present invention, is not limited to a system having the cloud-based service 1. The request management server 12 is not limited to a server on the cloud-based service, but may be an information processing apparatus that processes a print data acquisition request received from a client device located at each of a plurality of external access-limited sites.

Figure 2A:
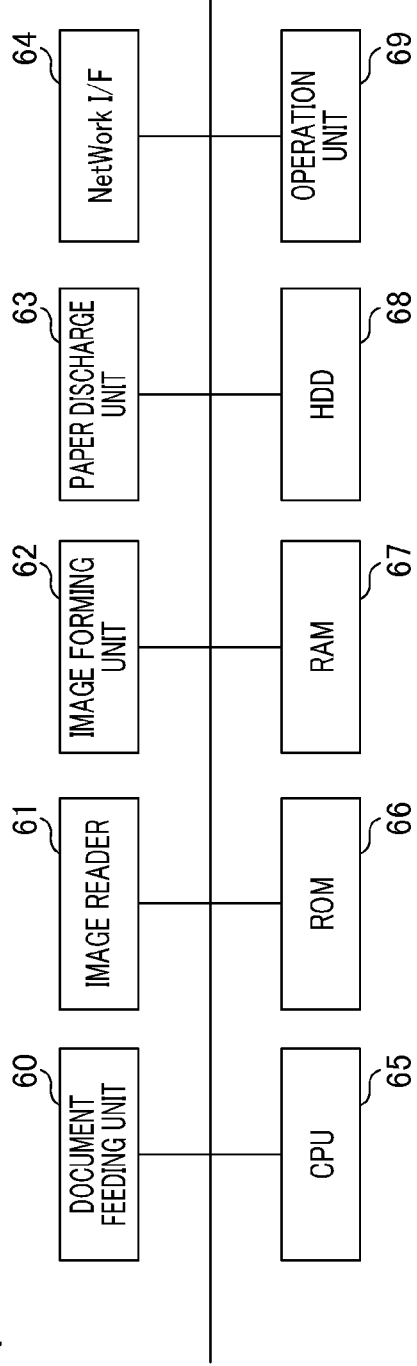
FIG. 2A is a diagram showing an example of the hardware configuration of a print device.

FIG. 2A shows an example of the hardware configuration of the print device 6. The print device 6 includes a document feeding unit 60, an image reader 61, an image forming unit 62, a paper discharge unit 63, and a Network I/F (Interface) 64. The print device 6 further includes a CPU 65, a ROM (Read Only Memory) 66, a RAM (Random Access Memory) 67, an HDD 68, and an operation unit 69. The document feeding unit 60 feeds the document to be read. The image reader 61 reads the document that has been fed by the document feeding unit 60. The image forming unit 62 converts the document read by the image reader 61 or the print data acquired from the print server 5 via a network into a printed image and provides a printout of the printed image on a print medium such as a paper. The paper discharge unit 63 discharges the print-output print medium and carries out processing such as sorting, stapling, and the like. The Network I/F 64 is connected to the LAN and the WAN 2 via a network to communicate with an external device (e.g., the print server 5).

The CPU 65 controls the entire print device. More specifically, the CPU 65 reads the control program for the print device 6, which has been stored in the ROM 66 or the HDD 68, to the RAM 67, and executes processing in accordance with the control program. The ROM 66 is a non-volatile storage unit, and stores the control program for the print device 6 and the data employed by the control program. The RAM 67 is a rewritable storage unit, and stores the temporary data relating to the processes executed by the print device 6. The HDD 68 stores the control program for the print device 6, the data employed by the control program, temporary data, and the like. The operation unit 69 displays a screen, and receives a user's operation instruction via the screen.

Figure 2B:
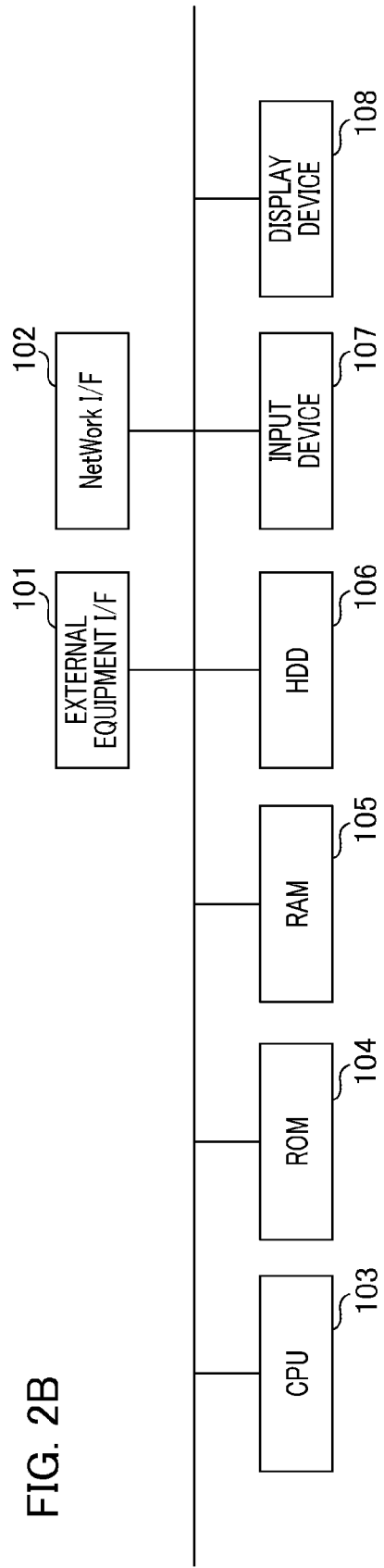
FIG. 2B is a diagram showing an example of the hardware configuration of a server, a client device, and firewall.

FIG. 2B shows an example of the hardware configuration of a server, a client device, and a firewall. As used herein, the term "server" refers to the print server 5, the work server 11, or the request management server 12. In the description of FIG. 2B, a server, a client device, and a firewall are collectively referred to as a "processing unit". A CPU 103 shown in FIG. 2B reads the control program for the processing unit, which has been stored in a HDD 106, to a RAM 105, and executes processing in accordance with the control program to thereby control the processing unit. A ROM 104 stores the control program for the processing unit and data. The RAM 105 stores the temporary data relating to the processes executed by the processing unit. The HDD 106 stores the control program for the processing unit, the data employed by the control program, temporary data, and the like. An input device 107 is a keyboard, a pointing device, or the like that inputs instructions to the processing unit. A display device 108 displays the operation state of the processing unit, and information output by the programs that operate on the processing unit. An external equipment I/F 101 is an interface that communicates with an external storage device. A Network I/F 102 communicates with an external device via a network.

FIG. 3A is a diagram illustrating an example of a work page display screen. When the user of the client device 7 has logged in the work server 11, the work server 11 provides a work page to the client device 7. As shown in FIG. 3A, the Web browser on the client device 7 displays a work page provided by the work server 11. In the work page shown in FIG. 3A, a work operating area 201 is an area through which data input is performed depending on the job content. An input column, a selection pull-down, and the like for inputting data are arranged on the work operating area 201.

A save button 202 is a button by which the client device 7 transmits data input to the work operating area 201 for saving. When the Web browser on the client device 7 detects that the save button 202 has been pushed by a user's operation, the Web browser transmits the data input to the work operating area 201 to the work server 11. The work server 11 receives the data transmitted from the client device 7, and stores it in a predetermined storage unit (e.g., the HDD 106 shown in FIG. 2B). A print button 203 is a button by which the client device 7 makes a document acquisition request to the request management server 12. A URL (Uniform Resource Locator) corresponding to the request management server 12 is linked to the print button 203. When the Web browser on the client device 7 detects that the print button 203 has been pushed, the client device 7 makes a document acquisition request to the request management server 12 corresponding to the URL to which the print button 203 is linked. When a document acquisition request is made, request information is passed as a parameter from the client device 7 to the request management server 12. The request information at least includes identification information for the user of the client device 7 and identification information for the storage location of print data to be acquired.

FIG. 3B is a diagram illustrating an example of request information that is passed from a client device to a request management server. Request information includes a content URI (Uniform Resource Identifier), a session ID, and a user name. The content URI is identification information, which is stored in the work server 11, for the storage location of print data to be acquired. Print data, which is stored in the storage location indicated by the content URI, is print data to be acquired. The session ID is an ID that has been issued by the work server 11 for specifying the client device when the client device 7 has logged in the work server 11. The user name is the name (identification information) of the user who has logged in the work server 11.

Figure 4A:
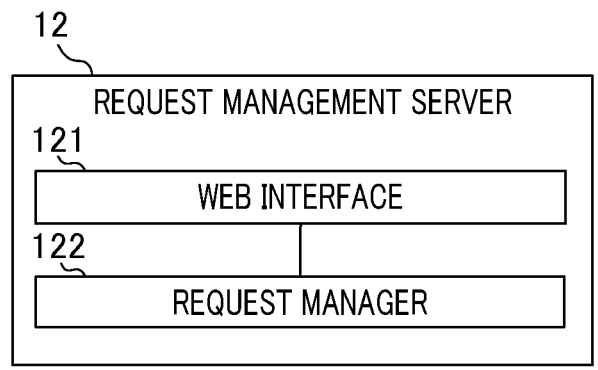
FIG. 4A is a functional block diagram illustrating an example of a request management server.
Figure 4B:
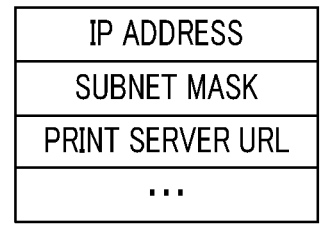
FIG. 4B is a diagram illustrating an example of redirect destination information.

FIG. 4A is a functional block diagram illustrating an example of a request management server. FIGS. 4B and 4B are functional block diagrams illustrating an example of redirect destination information held by the request management server. The request management server 12 includes a Web interface 121 and a request manager 122. The Web interface 121 is an interface for HTTP (Hypertext Transfer) or HTTPS (HTTP over Secure Socket Layer). The Web interface 121 functions as a request receiving unit configured to receive a document acquisition request from the client device 7 and acquire request information which is passed as a parameter upon receiving request information. Also, the Web interface 121 acquires network address information of the client device 7 which has made a document acquisition request to the request management server 12. More specifically, the Web interface 121 receives a notification of the IP address of the client device 7 by the function of the Web browser on the client device 7.

Also, the Web interface 121 receives a redirect destination registration request from the print server 5, and updates redirect destination information managed by the request manager 122. The redirect destination registration request is a request, which is made from the print server 5 to the request management server 12, for the registration of the print server 5 as the redirect destination for a document acquisition request.

The request manager 122 stores the redirect destination information in a predetermined storage unit for management, and executes the redirect request for the document acquisition request. In general, it is contemplated that a redirect method includes a server side (e.g., the request management server 12 side) redirect and a client side (the client device 7 side) redirect. The server side redirect is a method in which the server, which has received the document acquisition request, directly redirects to the print server 5 of the redirect destination for a document acquisition request, which is located within the site. The client side redirect is a method in which the server, which has received the document acquisition request, redirects to the print server 5 of the redirect destination for a document acquisition request, via the client device 7 of the receive destination for the document acquisition request.

A method for redirecting for the client side includes a method that uses the <meta> tag of a HTML (Hyper Text Markup Language), or a method that uses a Java™ Script. Here, an access from the request management server 12 to the print server 5 is limited by the firewall 3, whereby a redirect for the server side cannot be made. Hence, in the present embodiment, a redirect for the client side, which will be described below, is executed in order to perform a redirect to the print server 5 within the site beyond the firewall 3. The request manager 122 of the request management server 12 specifies the redirect destination based on the IP address, which has been acquired by the Web interface 121, of the client device 7 and the redirect destination information shown in FIG. 4B. The request manager 122 specifies the print server 5 within the site to which the client device 7 belongs as the redirect destination.

Redirect destination information shown in FIG. 4B includes an IP address, a subnet mask, and a print server URL. The domain of the print server 5 of the redirect destination is determined by the IP address and the subnet mask. More specifically, the request manager 122 takes the bit-by-bit logical product of the IP address and the subnet mask, whereby the domain of the print server 5 is determined. The print server URL is a URL of the print server 5 of the redirect destination. The print server URL is associated with the domain that is determined by the IP address and the subnet mask described above. In other words, the redirect destination information shown in FIG. 4B is the correspondence information between the domain pre-stored in the storage unit and the print device.

First, the request manager 122 takes the bit-by-bit logical product of the IP address, which is reported while receiving a document acquisition request, of the client device 7 and the subnet mask included in the redirect destination information shown in FIG. 4B. Thereby, the domain of the client device 7 is determined. Next, among the domains that are determined by the IP address and the subnet mask included in redirect destination information, the request manager 122 searches a domain that matches the domain of the client device 7. Then, the request manager 122 determines the print server URL, which corresponds to the domain that matches the domain of the client device 7, as the URL of the print server 5 of the redirect destination.

Figure 4C:
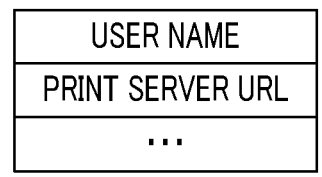
FIG. 4C is a diagram illustrating another example of redirect destination information.

The request manager 122 may specify the print server 5 of the redirect destination for a document acquisition request, based on the user name included in the request information acquired by the Web interface 121 and the redirect destination information shown in FIG. 4C. More specifically, the request manager 122 specifies the print server 5, which has been pre-registered in the redirect destination information shown in FIG. 4C, located within the site to which the client device 7 corresponding to the user name belongs as the redirect destination.

The redirect destination information shown in FIG. 4C includes a user name and a print server URL. The user name is the name of the user of the client device 7. The print server URL is the URL of the print server 5 of the redirect destination, and is the URL of the print server 5 located within the site to which the client device 7 corresponding to the user name belongs. In other words, the redirect destination information shown in FIG. 4C is the correspondence information between the user identification information of the user device pre-stored in the storage unit and the print device. The request manager 122 searches redirect destination information based on the user name included in the request information acquired by the Web interface 121. The request manager 122 determines the print server URL, which corresponds to a user name that matches the user name included in the request information, as the URL of the print server 5 of the redirect destination. In other words, the request manager 122 functions as a print device specification unit configured to specify a print device located in a local area, to which the user device that has made the print data acquisition request belongs, as the device that prints the print data.

As a response to the document acquisition request, the request manager 122 returns the redirect request for the document acquisition request to the client device 7, i.e., the reception origin of the document acquisition request. The redirect request for the document acquisition request is a request for a redirect of the document acquisition request to the specified print server 5. The request manager 122 adds the request information corresponding to the document acquisition request acquired by the Web interface 121 to the redirect request as a parameter, and transmits it to the client device 7. More specifically, the request manager 122 describes the URL of the print server 5 of the redirect destination in the <meta> tag of HTML, and sets request information as an argument of the URL.

The client device 7 receives the redirect request for the document acquisition request from the request manager 122, and makes (redirects) the document acquisition request to the print server 5 of the redirect destination. During a redirect, for example, the request information, which is set as an argument of the URL described in the <meta> tag of the aforementioned HTML, is passed to the print server 5 of the redirect destination. The print server 5 of the redirect destination acquires print data based on the content URI included in the passed request information. In other words, the request manager 122 functions as a print data acquisition instruction unit configured to provide an instruction to the specified print server 5 about the acquisition of the print data via the user device which has made the print data acquisition request. In the present embodiment, since the request management server 12 makes a redirect via the client 7 located on the same site as the print server 5 of the redirect destination for the document acquisition request, the request management server 12 can redirect to the print server 5 beyond the firewall 3. A method for controlling the information processing apparatus of the present embodiment and a computer program for the same can be realized by the function of the Web interface 121 and the request manager 122; both of which are provided in the request management server 12 described with reference to FIG. 4A.

Figure 5A:
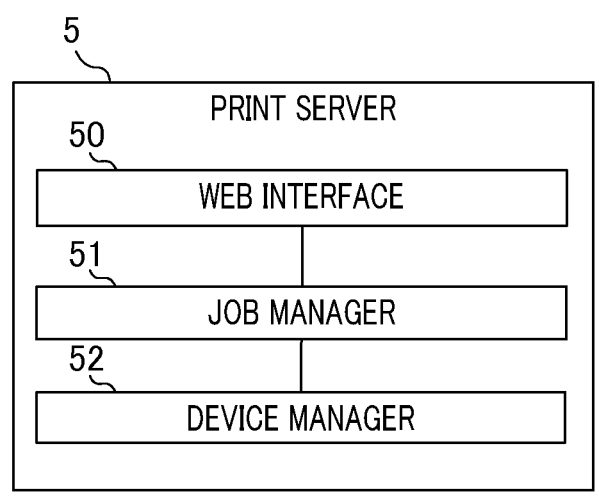
FIG. 5A is a diagram illustrating an example of the configuration of a print server.

FIG. 5A is a diagram illustrating an example of the configuration of a print server. The print server 5 includes a Web interface 50, a job manager 51, and a device manager 52. The Web interface 50 is the interface of HTTP or HTTPS. The Web interface 50 receives a document acquisition request, a document print request and a print job control request. The job manager 51 executes processing depending on the request received by the Web interface 50. More specifically, the job manager 51 acquires print data based on the content URI included in the request information that has been passed as a parameter when the Web interface 50 has received the document acquisition request. The job manager 51 generates document information, which is information relating to the acquired print data, and stores the generated document information in a predetermined storage unit for management. When the Web interface 50 receives a print request, the job manager 51 provides an instruction to the device manager 52 to cause it to transmit print data corresponding to the print request. The print device 6, which has received the transmission of print data, provides a printout of the print data.

Also, upon activation, the job manager 51 makes a redirect destination registration request described above to the request management server 12. When a redirect destination registration request is made, the job manager 51 notifies the IP address, the subnet mask, and the print server URL of the print server 5 that requests registration as the redirect destination to the request management server 12 as redirect destination information. The request management server 12 manages the reported redirect information in a data structure shown in FIG. 4B. When the job manager 51 makes a redirect destination registration request, the user name and the print server URL of the client device 7 may be reported as redirect destination information to the request management server 12. The user name is the name of the user managed by the print server 5, i.e., the user of the client device 7 located within the site to which the print server 5 belongs. The user name is employed for authorization and the like when the Web interface 50 has received a request. The request management server 12, which has received notification of the redirect destination information, manages the redirect information in a data structure shown in FIG. 4C.

Figure 5B:
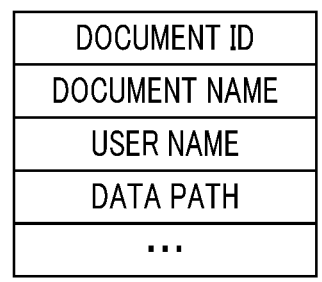
FIG. 5B is a diagram illustrating an example of document information.

FIG. 5B is a diagram illustrating an example of document information. The document information includes data items such as a document ID, a document name, a user name, a data path, and the like. The document ID is a job identifier to be issued by the job manager 51. The user name is the account name of the user of the client device 7 that has made a document acquisition request. The data path is a path to print data (document).

Referring back to FIG. 5A, the device manager 52 holds various types of information relating to the print device 6 that executes print processing. The device manager 52 receives an instruction from the job manager 51, and starts communication with the print device 6 to thereby perform print processing.

Figure 6:
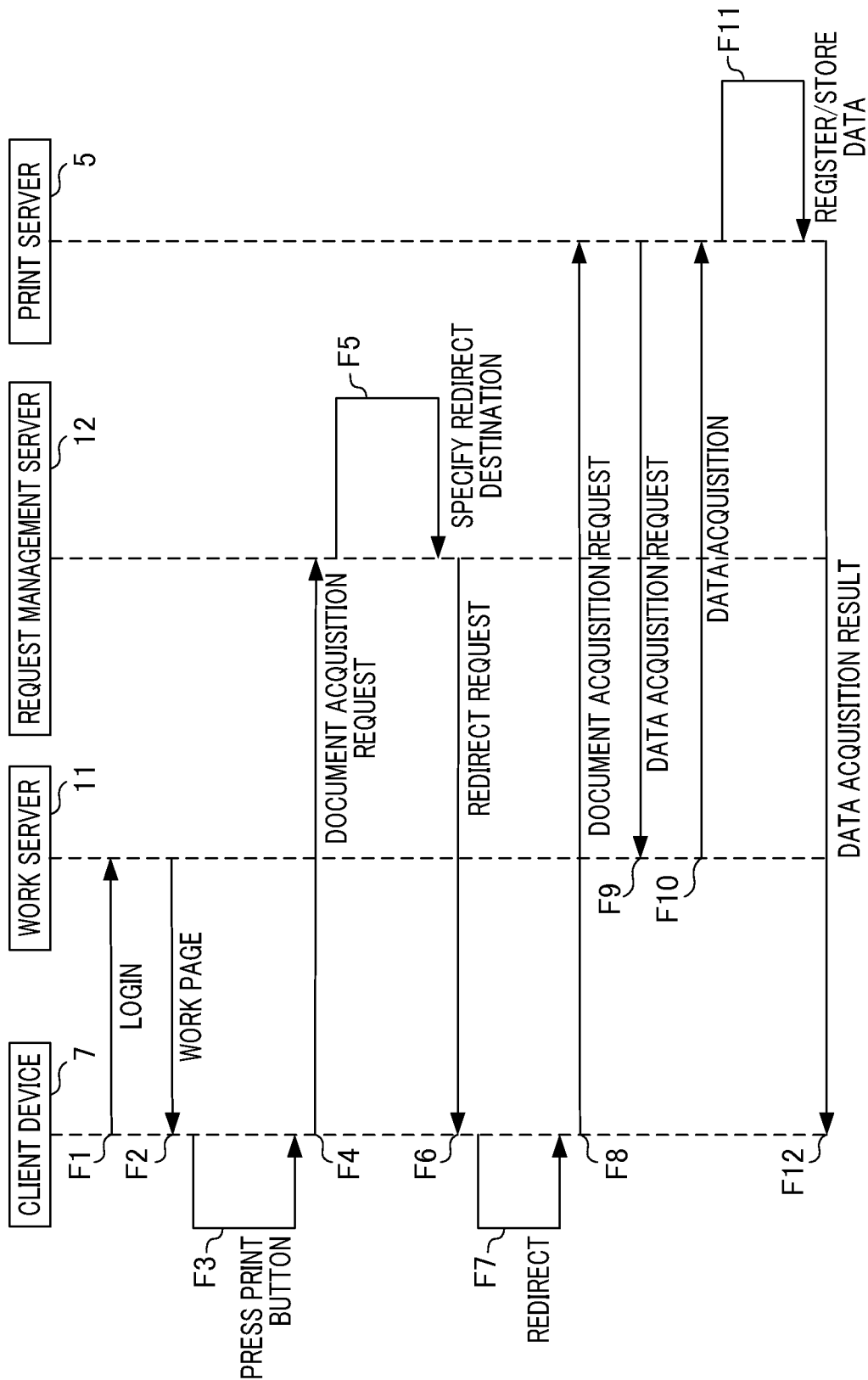
FIG. 6 is a sequence diagram for explaining a process of the document acquisition request.

FIG. 6 is a sequence diagram for explaining a process of the document acquisition request according to the first embodiment. First, the client device 7 logs in the work server 11 by reporting a user name and password using the Web browser (see F1 shown in FIG. 6). When login authorization is successful, the work server 11 generates a work page corresponding to the login user, and returns it to the Web browser on the client device 7 (see F2 shown in FIG. 6). Next, the Web browser on the client device 7 detects that the print button 203 (see FIG. 3A) on the work page has been pushed (see F3 shown in FIG. 6). Then, the client device 7 makes a document acquisition request to the URL of the request management server 12 linked to the print button 203 (see F4 shown in FIG. 6). When the document acquisition request is made, request information is reported as a parameter.

The request management server 12 receives the document acquisition request. Then, the request management server 12 specifies the print server 5 of the redirect destination, based on the user name, which is the parameter of the document acquisition request, included in the request information and the redirect destination information shown in FIG. 4C (see F5 shown in FIG. 6). The request management server 12 may specify the print server 5 of the redirect destination based on the IP address of the client device, which is reported upon receiving the document acquisition request, and the redirect destination information shown in FIG. 4B. Then, the request management server 12 returns the redirect request for the document acquisition request sent to the specified print server 5 to the client device 7 as a response to the received document acquisition request (see F6 shown in FIG. 6). When the redirect request is made, request information, which is the parameter of the document acquisition request, is passed to the client device 7.

Next, the client device 7 performs a redirect by the function of the Web browser (see F7 shown in FIG. 6). In other words, the client device 7 makes a document acquisition request to the print server 5 of the redirect destination (see F8 shown in FIG. 6). Upon the document acquisition request, the request information, which has been passed from the request management server 12 to the client device 7 upon the redirect request, is passed to the print server 5. The print server 5, which has received the document acquisition request, makes a data acquisition request to the content URI included in the request information that has been passed during the document acquisition request, i.e., the work server 11 (see F9 shown in FIG. 6). The data acquisition request indicates a print data transmission request.

Then, the print server 5 acquires print data from the work server 11 (see F10 shown in FIG. 6). Note that, when print data is acquired, the session ID and the user name included in the request information are required. When the acquisition of print data is successful, the print server 5 registers/stores data to thereby generate document information (see F11 shown in FIG. 6). Then, the print server 5 returns a print data acquisition result as a response to the document acquisition request to the client device 7 (see F12 shown in FIG. 6).

Figure 7:
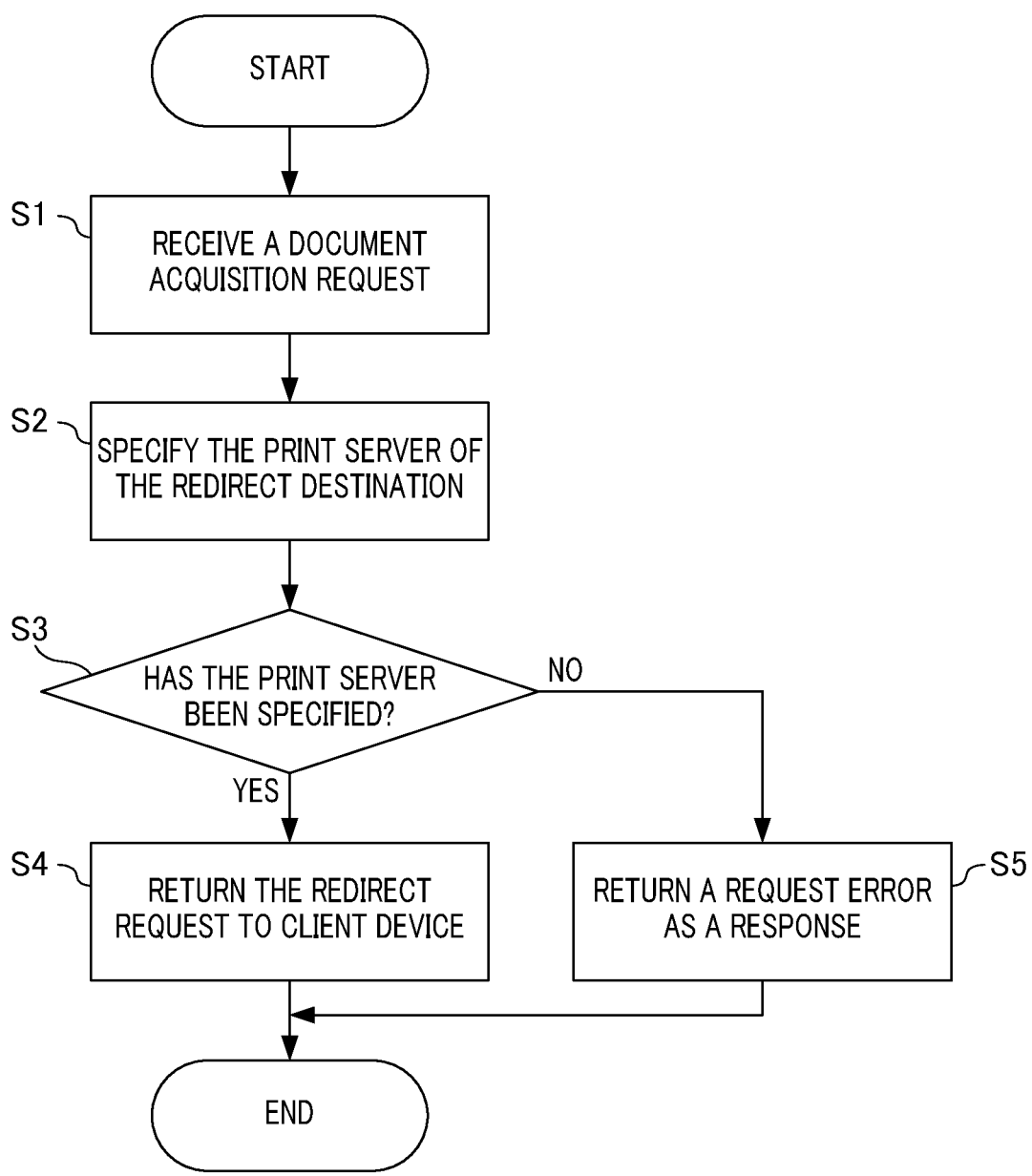
FIG. 7 is a diagram illustrating the operation processing flow of a request management server.

FIG. 7 is a diagram illustrating the operation processing flow performed when the request management server of the first embodiment receives a document acquisition request. A program of the request management server 12, which relates to the operation processing flow shown in FIG. 7, is pre-stored in the HDD 106 (see FIG. 2B). The program is read to the RAM 105 and executed by the CPU 103.

First, the request management server 12 receives a document acquisition request from the client device 7 (step S1), and acquires request information reported upon receiving the document acquisition request. Next, the request management server 12 specifies the print server 5 of the redirect destination based on the reported request information and the request destination information that is managed by the request management server 12 (step S2). The request management server 12 determines whether or not the print server 5 of the redirect destination has been specified (step S3). When the request management server 12 determines that the print server 5 of the redirect destination has not been specified, the request management server 12 returns a request error as a response to the client device 7 (step S5). On the other hand, when the request management server 12 determines that the print server 5 of the redirect destination has been specified, the request management server 12 returns the redirect request for the document acquisition request sent to the specified print server 5 to the client device 7(step S4).

Figure 8:
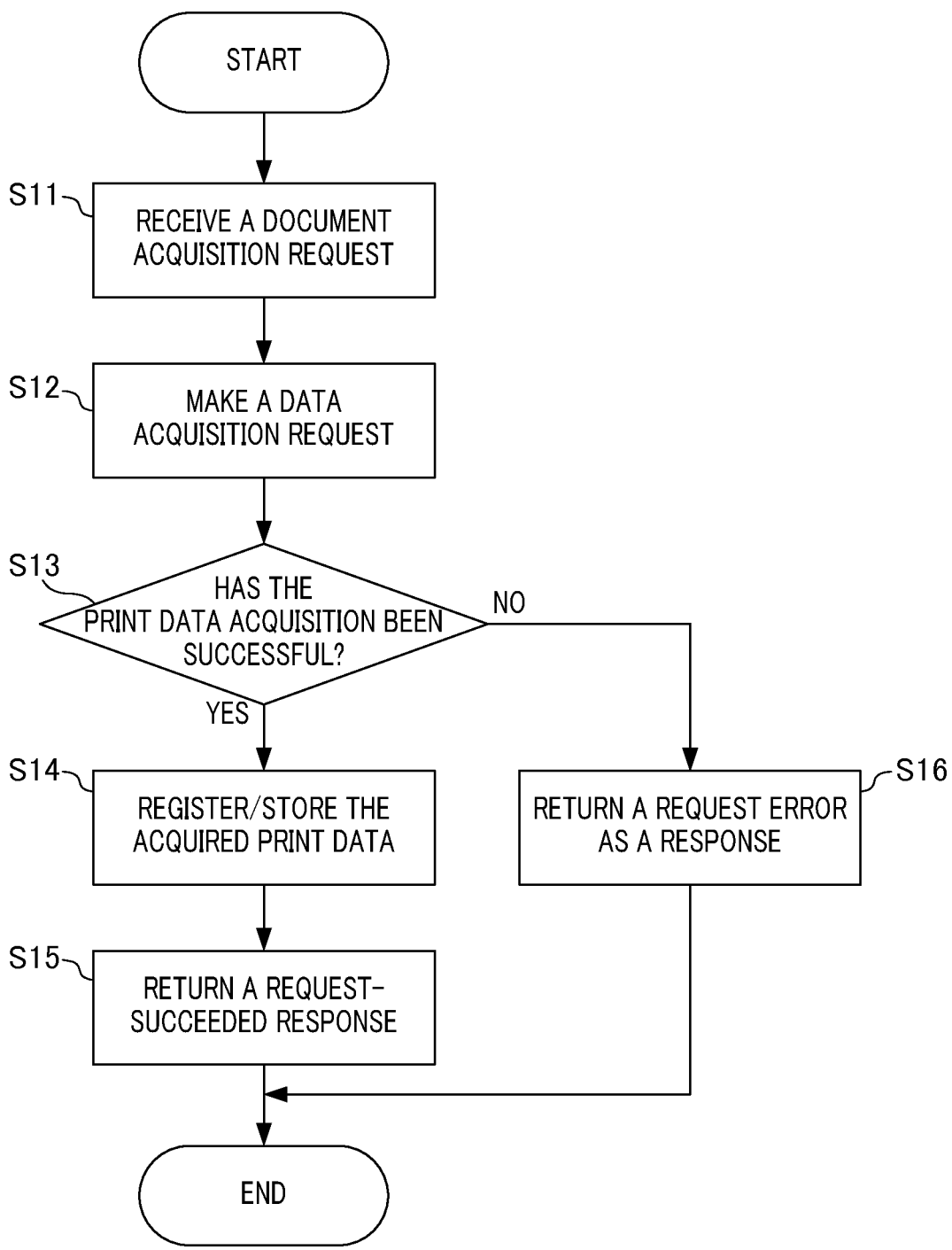
FIG. 8 is a diagram illustrating the operation processing flow of a print server.

FIG. 8 is a diagram illustrating the operation processing flow performed when the print server of the first embodiment receives a document acquisition request.

First, the print server 5 receives a document acquisition request from the client device 7 (step S11), and acquires request information reported upon receiving the document acquisition request. The print server 5 makes a data acquisition request to the content URI included in the acquired request information (step S12). The data acquisition request is made by using the session ID and the user name which are included in the request information. Next, the print server 5 determines whether or not the print data acquisition has been successful (step S13). When the print server 5 determines that the print data acquisition has been unsuccessful, the print server 5 returns a request error as a response to the client device 7 (step S16). When the print server 5 determines that the print data acquisition has been successful, the print server 5 registers/stores the acquired print data (step S14). Then, the print server 5 returns a request-successful response to the client device 7 (step S15).

Figure 9:
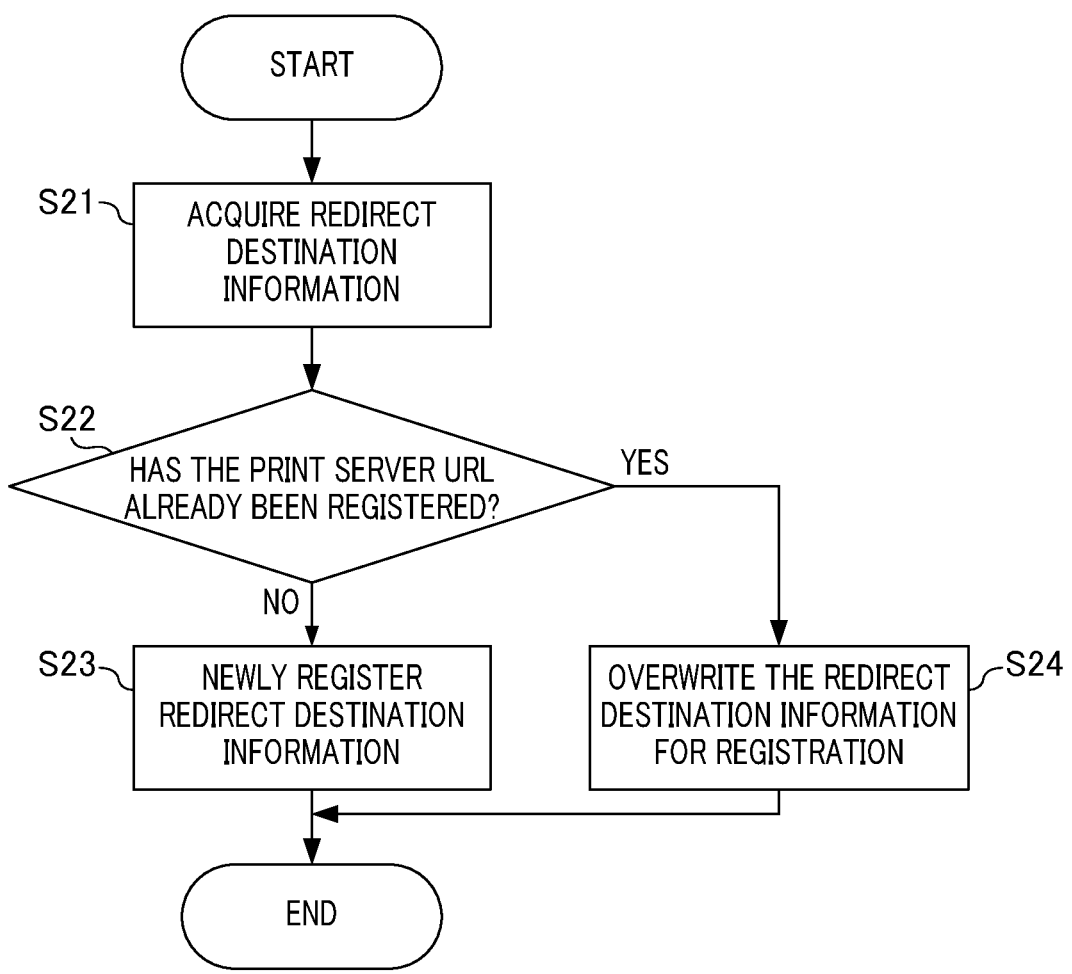
FIG. 9 is a diagram illustrating an example of the redirect destination registration processing flow.

FIG. 9 is a diagram illustrating an example of the redirect destination registration processing flow performed by the request management server of the first embodiment. The request management server 12 receives a request destination registration request from the print server 5, and acquires redirect destination information (step S21). Next, the request management server 12 performs the following processing with reference to the redirect destination information that is already being managed. In other words, the request management server 12 determines whether or not the print server URL included in the redirect destination information, which has been acquired in step S21, has already been registered (step S22). When the request management server 12 determines that the print server URL has already been registered, the request management server 12 overwrites the redirect destination information, which has been acquired in step S1, for registration (step S24). When the request management server 12 determines that the print server URL has not been registered, the request management server 12 newly registers the acquired redirect destination information (step S23).

As described above, the request management server 12 of the present embodiment makes a document acquisition request to the print server 5 at the site on which the client device 7 is located via the client device 7. Thus, the print server 5 at the site can acquire the print data held by the work server 11 beyond the firewall 3. Also, the request management server 12 of the present embodiment pre-registers information including the URL of the print server 5 of the redirect destination as redirect destination information, and specifies the redirect destination for the document acquisition request by using the redirect destination information. Thus, if the request management server 12 registers the redirect destination information including the URLs of the print servers 5 located at a plurality of sites in advance, the request, which has been received from the client device 7 located at each of the plurality of sites, can be allocated to the redirect destination.

Next, a description will be given of a second embodiment of the present invention. In the second embodiment, when the request management server 12 receives a document acquisition request from the client device 7, the print data corresponding to the document acquisition request is acquired from the work server 11 for management. More specifically, the request manager 12 provided in the request management server 12 also functions as a print data acquisition unit configured to acquire print data from the work server 11, which is the device for holding the print data, and generate document information (see FIG. 5B) for management. In the present embodiment, the request manager 122 also serves to receive a data acquisition request.

Figure 10:
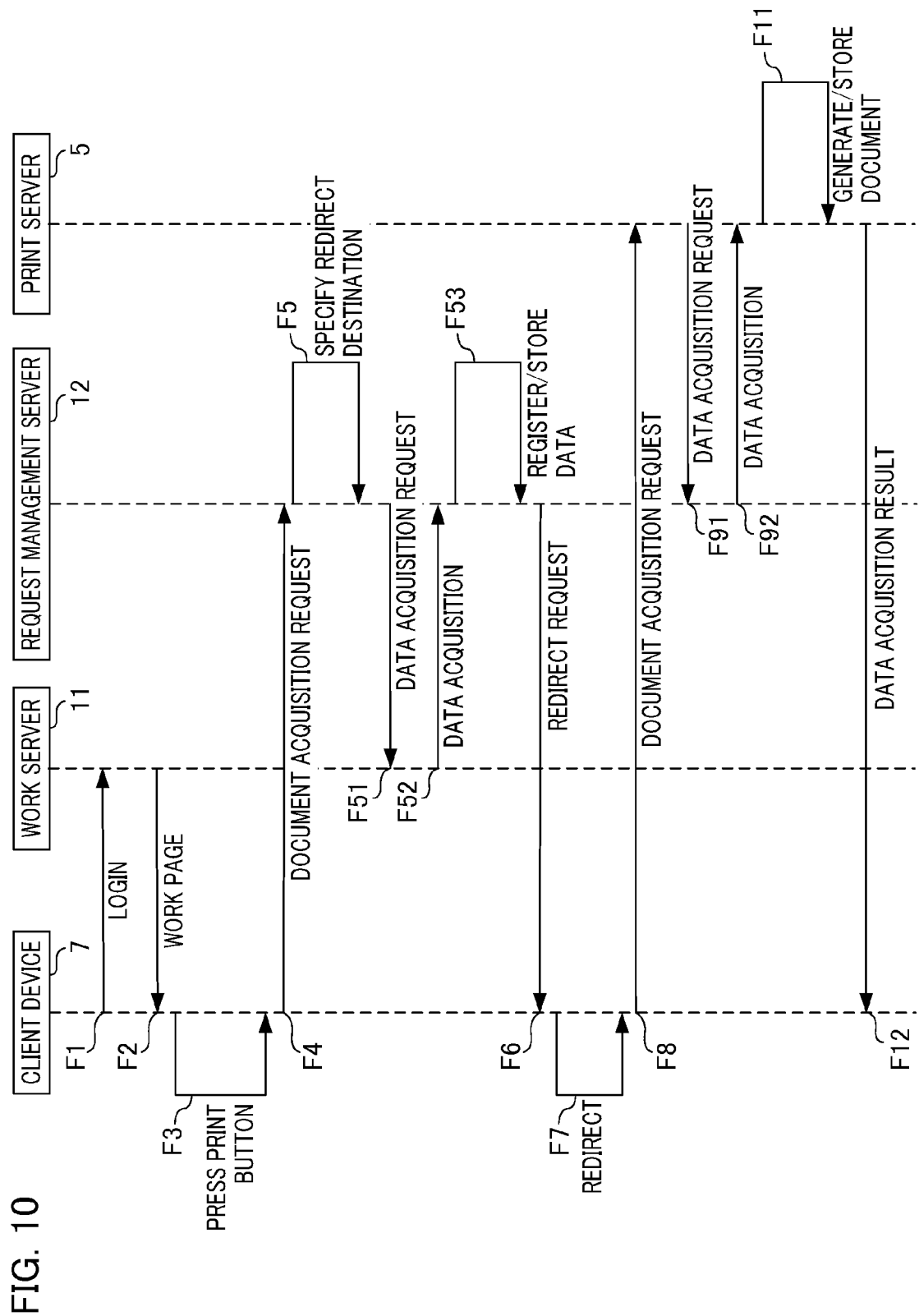
FIG. 10 is a sequence diagram for explaining a process of a document acquisition request.

FIG. 10 is a sequence diagram for explaining a process of a document acquisition request according to the second embodiment. The processes of F1, F2, F3, F4, F5, F6, F7, F8, F11, and F12 shown in FIG. 10 are the same as those of F1, F2, F3, F4, F5, F6, F7, F8, F11, and F12 shown in FIG. 6, respectively, and no further description will be given here on these processes.

In the second embodiment, when the request management server 12 specifies the redirect destination (see F5 shown in FIG. 10), the request management server 12 makes a data acquisition request to the work server 11 (see F51) to thereby acquire print data (see F52). Then, the request management server 12 registers/stores the acquired print data (see F53). More specifically, the request management server 12 generates the document information corresponding to the acquired print data for management. Note that the request management server 12 sets the storage location of the print data to be stored as the content URL included in the document information to be generated. Also, the request management server 12 passes the request information, which includes the content URL and the document ID indicating the storage location of the print data, as the parameter of the redirect request to be made in F6 to the client device 7. In the second embodiment, when the print server 5 receives a document acquisition request from the client device 7, the print server 5 makes a data acquisition request to the request management server 12 (see F91) to thereby acquire print data (see F92). In other words, in the second embodiment, the request management server 12 provides an instruction to the print server 5 of the redirect destination about the acquisition of the print data held by the request management server 12 via the client device 7.

Figure 11:
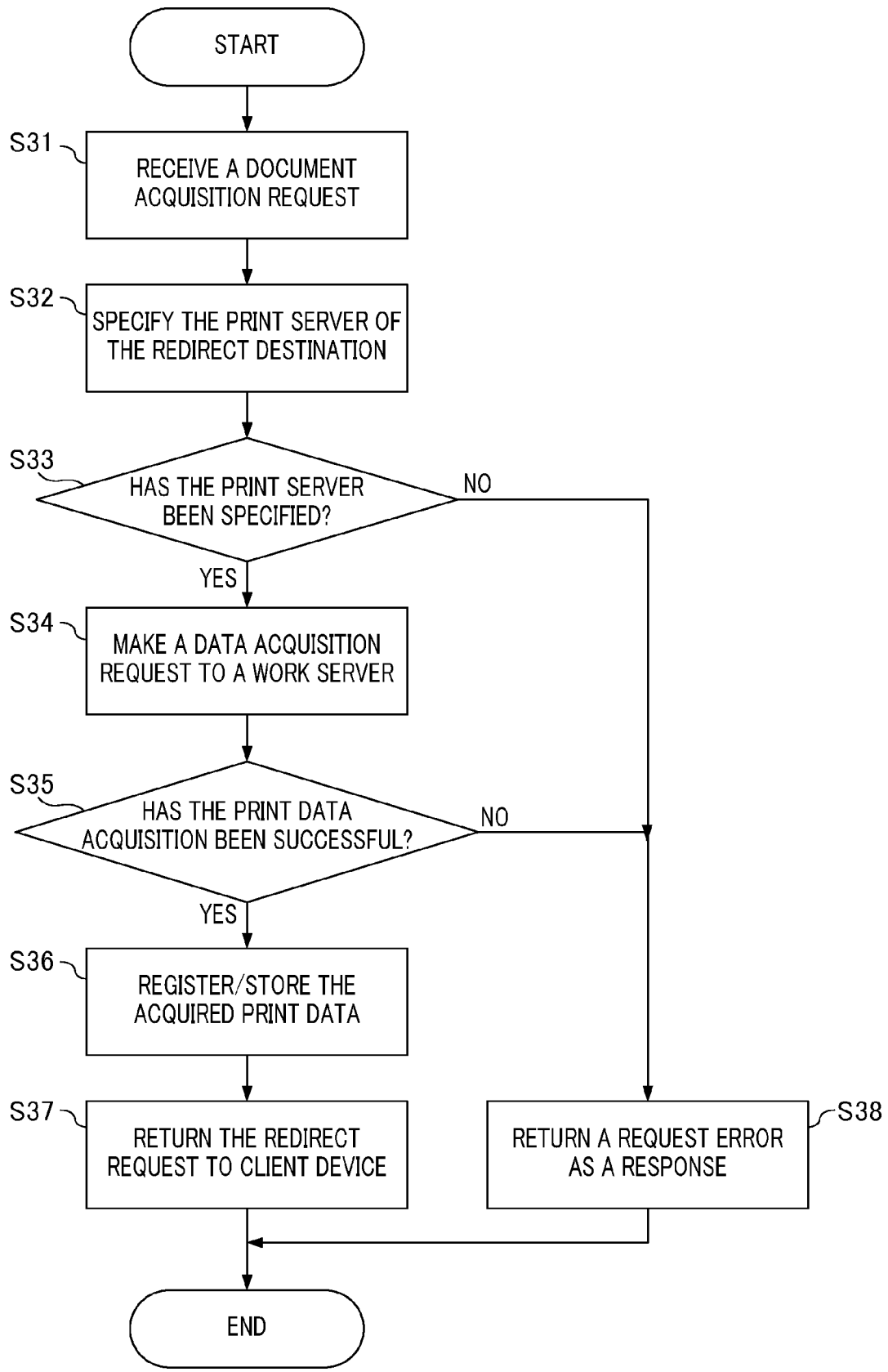
FIG. 11 is a diagram illustrating the operation processing flow of the request management server.

FIG. 11 is a diagram illustrating the operation processing flow, which is performed when the request management server receives a document acquisition request, according to the second embodiment. The processes of steps S31, S32, S33, S37, and S38 shown in FIG. 11 are the same as those of step S1, S2, S3, S4, and S5 shown in FIG. 7, respectively, and no further description will be given here on these processes. In the second embodiment, when it is determined in the process of step S33 that the print server 5 of the redirect destination has been identified, the request management server 12 performs the following processing. Specifically, the request management server 12 makes a data acquisition request to the work server 11 based on the content URL, which is the parameter of the received document acquisition request, included in the request information (step S34). Subsequently, the request management server 12 determines whether or not the print data acquisition has been successful (step S35). When the request management server 12 determines that the print data acquisition has been unsuccessful, the process advances to step S38. When the request management server 12 determines that the print data acquisition has been successful, the request management server 12 registers/stores the acquired print data (step S36). According to the second embodiment, the print data to be printed and the document information can be centrally managed by the request management server 12 on the cloud-based service 1.

According to the information processing apparatus of the present invention described above, the print data acquisition requests, which have been made from the user devices in a plurality of access-limited local areas, can be allocated to the print devices in the plurality of local areas. Consequently, for example, the data held by the work server on the cloud-based service can be printed out by the print servers located at a plurality of sites.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-297148 filed Dec. 28, 2009, which are hereby incorporated by reference herein in their entirety.

What is claimed is:

1. An information processing apparatus that is communicable with a plurality of site systems comprised of a user device, a print device, and a print server that manages a print job relating to the print device, comprising:

at least one processor; and
a memory storing computer executable code that, when executed by the processor, causes the information processing apparatus to perform:
providing a work page including a print button for printing data saved in the information processing apparatus;
specifying a print server located in a same site with a user device based on a user name of a user who operates the user device in response to a press of the print button included in the work page provided by the providing step;
determining whether or not the print server located in the same site with the user device is specified;
transmitting, to the user device, a data acquisition request including the user name and a URL (Uniform Resource Locator) of the data, and a redirect instruction for redirecting to a URL of the print server specified by the specifying step when it is determined that the print server located in the same site with the user device is specified, and transmitting a request error to the user device when it is determined that the print server located in the same site with the user device is not specified; and
updating a registered URL of the print server with a URL acquired from the print sever as redirect destination information when the acquired URL differs from the registered URL,
wherein the user device that has received the redirect instruction transmits the data acquisition request to the print server corresponding to the URL of the print server, and
wherein the print server that has received the data acquisition request acquires data relating to the user name by accessing the URL of the data so as to register a print job corresponding to the acquired data, and transmits the print job to the print device.

2. The information processing apparatus according to claim 1, wherein the work page provided by the providing step includes a save button for saving a value input via the work page as data.

3. A method for controlling an information processing apparatus that is communicable with a plurality of site systems comprised of a user device, a print device, and a print server that manages a print job relating to the print device, comprising:

providing a work page including a print button for printing data saved in the information processing apparatus;
specifying a print server located in a same site with a user device based on a user name of a user who operates the user device in response to a press of the print button included in the work page provided by the providing step;
determining whether or not the print server located in the same site with the user device is specified;
transmitting, to the user device, a data acquisition request including the user name and a URL of the data, and a redirect instruction for redirecting to a URL (Uniform Resource Locator) of the print server specified by the specifying step when it is determined that the print server located in the same site with the user device is specified, and transmitting a request error to the user device when it is determined that the print server located in the same site with the user device is not specified; and
updating a registered URL of the print server with a URL acquired from the print server as redirect destination information when the acquired URL differs from the registered URL, wherein the user device that has received the redirect instruction transmits the data acquisition request to the print server corresponding to the URL of the print server, and wherein the print server that has received the data acquisition request acquires data relating to the user name by accessing the URL of the data so as to register a print job corresponding to the acquired data, and transmits the print job to the print device.

4. A non-transitory computer readable storage medium on which is stored a computer program for making a computer execute a method for controlling an information processing apparatus that is communicable with a plurality of site systems comprised of a user device, a print device, and a print server that manages a print job relating to the print device, the program comprising:

code for providing a work page including a print button for printing data saved in the information processing apparatus;

code for specifying a print server located in a same site with a user device based on a user name of a user who operates the user device in response to a press of the print button included in the work page provided by the providing code;

code for determining whether or not the print server located in the same site with the user device is specified;

code for transmitting, to the user device, a data acquisition request including the user name and a URL of the data, and a redirect instruction for redirecting to a URL (Uniform Resource Locator) of the print server specified by the specifying code when it is determined that the print server located in the same site with the user device is specified, and transmitting a request error to the user device when it is determined that the print server located in the same site with the user device is not specified; and code for updating a registered URL of the print server with a URL acquired from the print server as redirect destination information when the acquired URL differs from the registered URL, wherein the user device that has received the redirect instruction transmits the data acquisition request to the print server corresponding to the URL of the print server, and wherein the print server that has received the data acquisition request acquires data relating to the user name by accessing the URL of the data so as to register a print job corresponding to the acquired data, and transmits the print job to the print device.

* * * * *